United States Patent [19]

Stephenson

[11] 4,324,418
[45] Apr. 13, 1982

[54] PASSIVE SEAT BELT SYSTEM

[75] Inventor: Robert L. Stephenson, Utica, Mich.

[73] Assignee: Allied Corporation, Morris Township, Morris County, N.J.

[21] Appl. No.: 134,253

[22] Filed: Mar. 26, 1980

[51] Int. Cl.³ .............................................. B60R 21/10
[52] U.S. Cl. .................................... 280/802; 280/808
[58] Field of Search ............... 280/801, 802, 803, 804, 280/807, 808; 297/469, 474, 475, 481, 486

[56] References Cited

U.S. PATENT DOCUMENTS

| | | | |
|---|---|---|---|
| 3,850,446 | 11/1974 | Hogensen | 280/802 |
| 3,863,983 | 2/1975 | Wriedt | 280/804 |
| 4,084,841 | 4/1978 | Hayashi | 280/802 |
| 4,190,266 | 2/1980 | Cachia | 280/802 |
| 4,213,637 | 7/1980 | Mauron | 280/802 |
| 4,222,588 | 9/1980 | Suzuki | 280/804 |
| 4,234,210 | 11/1980 | McNally | 280/804 |

Primary Examiner—Joseph F. Peters, Jr.
Assistant Examiner—Randall A. Schrecengost
Attorney, Agent, or Firm—Roger H. Criss

[57] ABSTRACT

A vehicle passive seat belt system wherein the opening of either the door adjacent to the driver, or that adjacent to a passenger, or both, automatically moves both seat belt systems from a first restraining position to a second non-restraining position. The energy required is obtained from the closing of the doors, and released to activate the mechanism for moving the seat belts to the second non-restraining position when either or both doors are opened. A flexible tape is used to transfer the energy.

9 Claims, 7 Drawing Figures

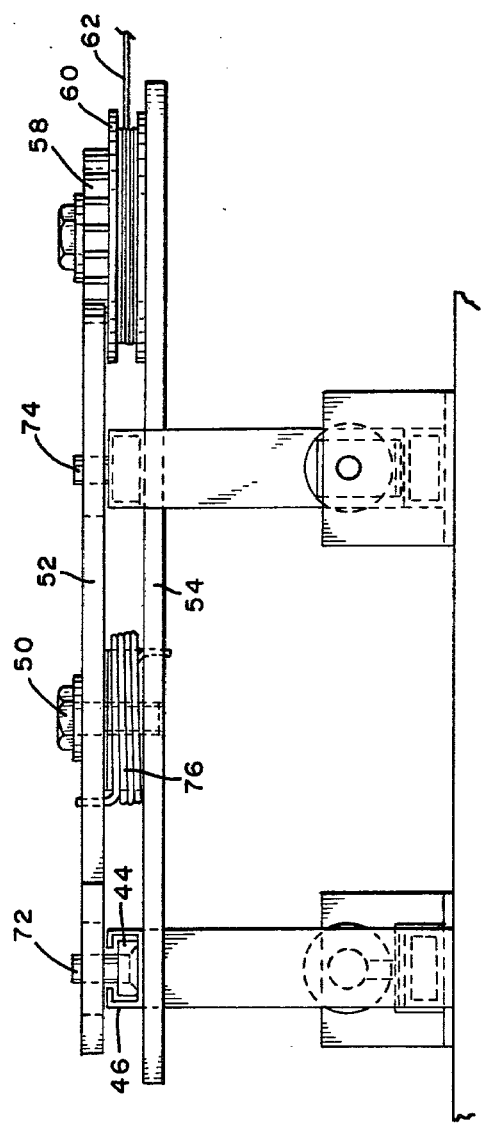

ONLY DRIVER'S DOOR OPEN

ONLY PASSENGER DOOR OPEN

BOTH DOORS OPEN

BOTH DOORS CLOSED

PASSIVE SEAT BELT SYSTEM

DESCRIPTION

BACKGROUND OF THE INVENTION

1. Field of the Invention

This invention relates to a passive safety seat belt system including an automatic mechanism for moving seat belts from a first occupant restraining position to a second non-restraining position wherein individuals may enter or leave the vehicle without interference from the safety seat belts.

2. Description of the Prior Art

Various means have previously been suggested to move shoulder belt or shoulder and lap belt passive seat belt systems into and out of occupant restraining positions. Pivotable mechanisms have been suggested in U.S. Pat. No. 4,190,266 to Cachia (wherein a lever is pivotably mounted along the roof line of the vehicle), U.S. Pat. No. 3,850,446 to Hogensen (wherein a lever is pivoted on the door) and U.S. Pat. No. 4,084,841 to Hayashi et al. (wherein a lever is pivotable on the inboard side of the occupant's seat). It has also been suggested to move the belts associated with a vehicle seat to their non-restraining position by utilizing a gas spring which is actuated by movement of the adjacent door.

It would be desirable to provide a simple and inexpensive mechanism to move the belts to their restraining and non-restraining positions. It would also be desirable to provide a passive seat belt system with more efficient control over movement of all of the passive seat belts in a vehicle.

SUMMARY OF THE INVENTION

In accordance with this invention, there is provided a vehicle passive seat belt system for use in a vehicle having a driver's door and a passenger's door and seating positions adjacent to the doors, the system comprising:

actuating means associated with each of the doors and being actuated upon the opening of the respective door;

seat belt systems associated with each of the the seating positions;

belt moving means associated with each of the seat belt systems for moving the same into and out of occupant restraint positions; and means responsive to actuation of each of the actuating means to permit the moving means to move each of the seat belt systems out of its occupant restraint position, whereby upon opening of either of the doors, each of the seat belt systems is moved out of its occupant restraint position.

Preferably, the actuating means is in the form of an energy storage means such as a gas spring. Also, a single means is preferably connected to each actuating means, such as by a flexible tape, and such single means permits the moving means to move the seat belt systems to their occupant restraint positions upon closing of both doors.

In addition, the present invention provides a passive seat belt system adapted for installation in a vehicle, the system comprising:

seat belt restraint means movable between a restraining position and a non-restraining position in response to a condition of the vehicle; and actuating means responsive to sensing of the condition of the vehicle and comprising elongated flexible tape means, containing means to contain the tape means, the tape means being slidably movable in the containing means, the tape means being movable in a first direction in response to sensing of the condition of the vehicle whereby the seat belt restraint means is movable to its non-restraining position and the tape means being movable in a second, opposite direction in response to sensing of the absence of the condition of the vehicle, whereby the seat belt restraint means is movable to its restraining position.

Preferably, the condition of the vehicle which is being sensed is the opening and closing of a vehicle door and the containing means is a track within which the tape slides.

BRIEF DESCRIPTION OF THE DRAWINGS

FIG. 3 is a side view of a portion of the assembly of FIG. 2.

DESCRIPTION OF THE PREFERRED EMBODIMENTS

Figure 1:
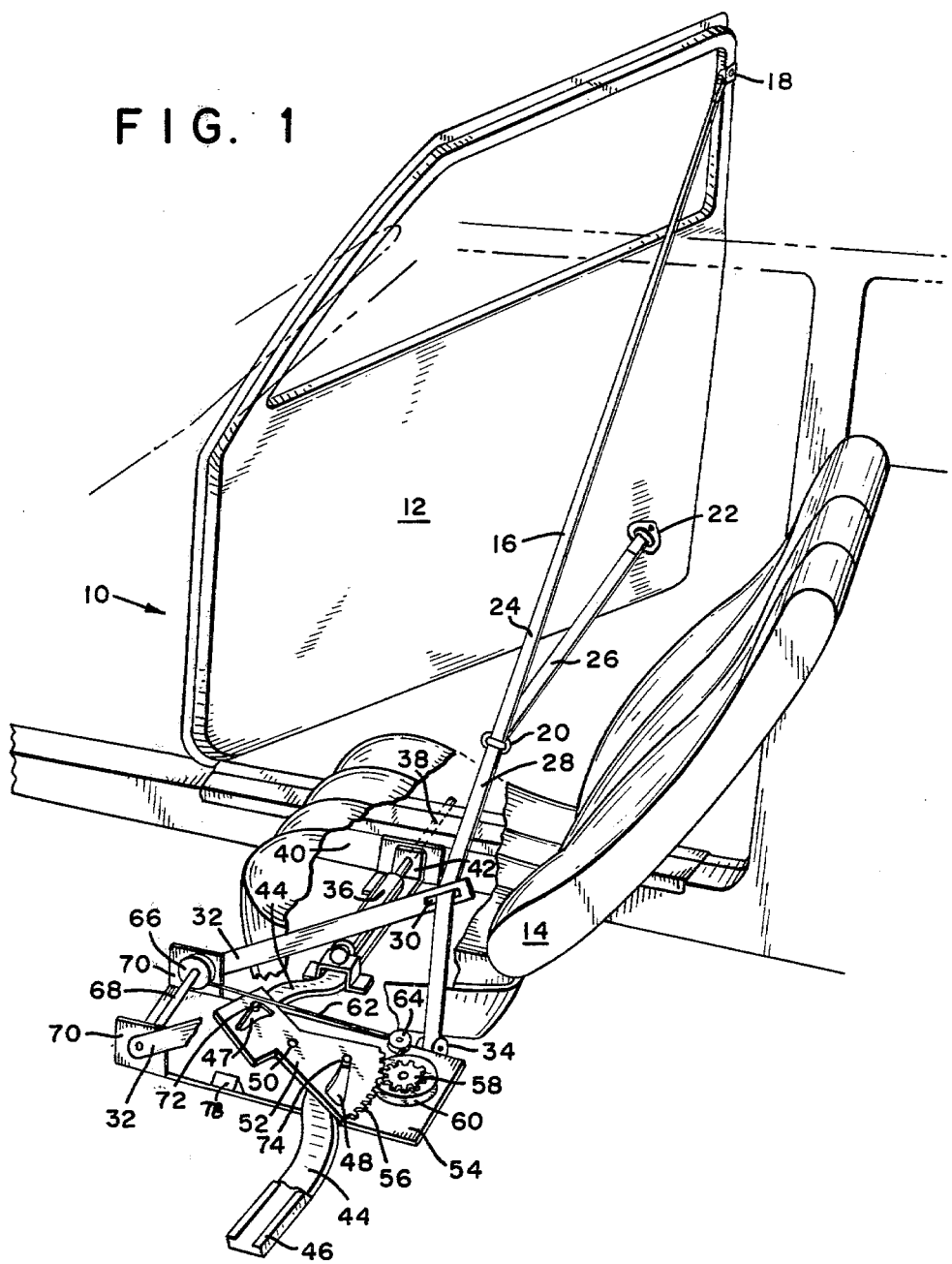
FIG. 1 is a perspective view of the passive seat belt system of this invention for a passenger's seat with sections cut away.

With reference to FIG. 1, there is shown a passive seat belt system, generally indicated at 10, in a vehicle which includes a door 12 and an adjacent seat 14. A loop of seat belt webbing 16 is anchored to the upper rear corner of door 12 by anchor plate 18. Webbing 16 extends through a junction ring 20 and back to door 12 where it is attached at a lower rearward position through anchor plate 22. The portion of loop 16 extending from anchor 18 to ring 20 defines a shoulder belt 24 and the portion extending from ring 20 to anchor 22 defines a lap belt 26. Webbing 16 is slidable through ring 20.

A length of webbing 28 has one end secured to ring 20. This connecting belt extends across seat 14 when door 12 is open and passes slidably through an opening 30 in pivotable lever 32, and is attached at its opposite end to a conventional retractor 34 which is anchored on the inboard side of seat 14.

It can be seen that if pivotable lever 32 is raised towards the perpendicular, it will draw the length of webbing 28 and with it shoulder belt 24 and lap belt 26 forwards in the vehicle and away from seat 14, thus enabling an individual to enter the vehicle and be seated, or leave the seat, without interference from the safety seat belts.

The present invention provides a manner of activating lever 32 and a parallel lever, shown in part, associated with the driver's seat (not shown) to move both the seat belts of the passenger's seat and of the driver's seat to positions of non-restraint upon opening either or both doors; and to return these seat belts to their restraining position upon the closing of both doors. More particularly, this invention provides a means to achieve such action without the needs of expensive power sources such as electric motors, or complicated mechanical devices requiring considerable maintenance to keep operable.

Figure 2:
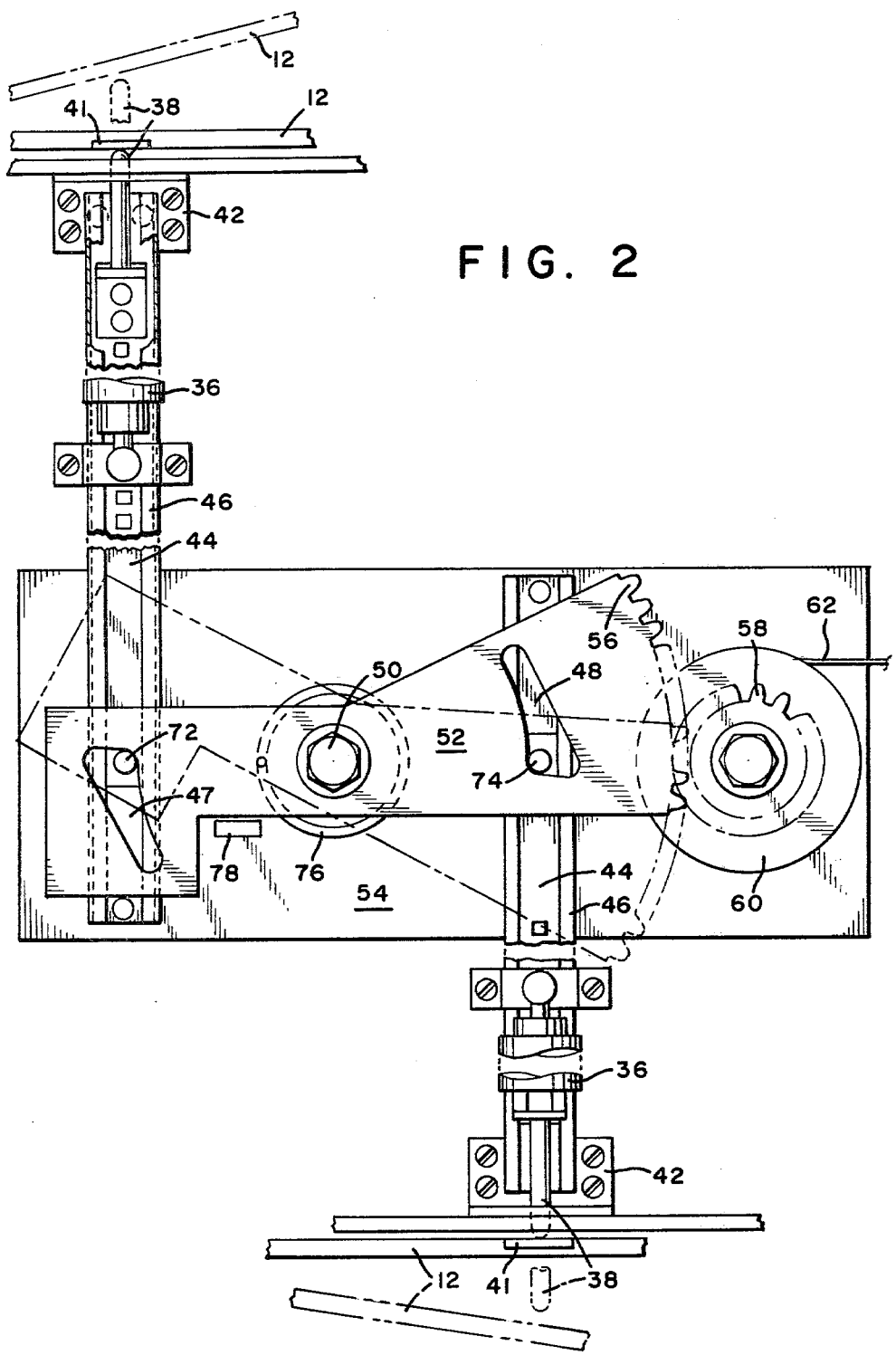
FIG. 2 is a detailed plan view of the drive mechanism of the assembly of FIG. 1 with the seats, the articulating device and the seat belts removed, and with the doors in their closed position.

With further reference to FIG. 1, it will be noted that the mechanism can be conveniently concealed beneath the front seats because of its slim profile. Cylinder 36 represents a spring, preferably a pressurized gas spring, which is fixed to the floor of the vehicle beneath seat 14 and contains a piston. Such gas springs are conventional and have been used to assist in the lifting of hatchbacks, hoods, etc. It is to be understood that a mechanical spring, a hydraulic cylinder or the like may also be employed. The piston rod 38 attached thereto extends slidably through the sill 40 of door 12 to a point were it will be struck by a striker-plate 41 (FIG. 2) on the bottom edge of door 12 on closing. This extended portion of the piston rod 38 constitutes a sensing element which senses whether the vehicle's door is open or closed. When door 12 on closing strikes this sensing element, the piston is driven inwardly to compress the gas, and the piston is retained by the closed door in this cocked position. Not shown in this drawing is the driver's side of the vehicle where a corresponding cylinder is positioned to be similarly cocked by the closing of the driver's door, or allowed to thrust its piston rod outwardly when the driver's door is opened, due to the stored energy of compressed gas. This matching mechanism is indicated in FIGS. 2-4.

Fixed to piston rod 38 is bracket 42 which moves in accordance with the stroke of the piston rod. The lower portion of bracket 42 is fixed to an elongated flexible tape 44. This tape may comprise molded or extruded flexible plastic materials, but preferably they are flexible elastomeric polyester tapes. A corresponding tape is associated with the driver's seat. Tapes 44 are enclosed totally or partially within a sleeve or track 46 preferably of metal, to provide guidance and rigidity.

Flexible tapes 44 terminate in rivet-like vertical pins which extend upwardly within slotted openings 47 and 48 placed at points equidistant from pivot bearing 50 of a gear segment 52. Gear segment 52 comprises a flat rotatable structure having the two openings 47 and 48 essentially in a straight line with pivot bearing 50, and positioned substantially along the perimeter of a circle having as a radius the distance from the pivot point to either opening. Gear segment 52 is arranged for limited rotation about pivot 50, the degree of rotation being brought about by the limited motion of one or both of the rivet-like vertical pins 72 and 74 in the tape terminals, hereinafter referred to as terminal pins. Pivot bearing 50 of gear segment 52 rotates on a fixed pin extending upwardly from a support base 54 mounted on the vehicle floor between the front seats, and gear segment 52 rotates in a horizontal plane parallel to support base 54. A helical spring 76 (FIG. 3) encircles the pivot pin at 50, between gear segment 52 and support plate 54. The lower end of spring 76 is anchored in base support plate 54 and the upper end in gear segment 52. Spring 76 is under tension such that it urges gear segment 52 about pivot point 50 in a counterclockwise direction until stopped in consequence of either one or both terminal pins 72, 74 of flexible tapes 44 encountering the ends of the slotted openings 47 and/or 48.

The rearward end of the gear segment 52 defines an arc of a circle having as its center the pivot point 50. This arc carries gear teeth 56 which mesh with teeth of a rotatable pinion gear 58, also rotatable on a horizontal plane, and turning on a vertical pin fixed to base support 54. Pinion gear 58 is concentrically fixed to a sheave 60 about which cable 62 is wound in a clockwise direction. Cable 62 passes around a second sheave 64 to change direction, and then enters the groove of a third sheave 66 from below as viewed in FIG. 1, completing at least half a turn on this sheave before terminating fixedly in the perimeter of sheave 66.

Sheave 66 is fixed to shaft 68 which is journaled in two parallel upright legs 70, preferably being a part of the support base 54, and extending upward therefrom. Also fixed to shaft 68, preferably at opposite points just outside the upright legs of the support base 54 to which the shaft is journaled, are the two pivotable levers 32 having at their other ends openings 30 through which webbing 28 passes.

The length of cable 62 is such that when the doors 12 of the vehicle are closed, the pivotable levers 32 have been allowed to drop to their substantially horizontal position where the seat belts are in their occupant restraint position.

When both doors 12 of the vehicle are closed, they restrain the piston rods 38 and the pistons of cylinders 36 in the cocked and compressed position. Both elongated flexible tapes 44, being fixed to piston rods 38 are therefore extended inwardly to their first position, with their terminal pins 72, 74 in slotted openings 47 and 48, holding gear segment 52 in its first position. Helical spring 76 has rotated gear segment 52 counterclockwise to the maximum degree permitted by the terminal pins.

If desired, a fixed stop 78 extending upwardly from support base 54 may be provided to limit the counterclockwise rotation of gear segment 52 at its first position. In this case the terminal pins at slots 47 and 48 would be exerting no force when gear segment 52 is in its first position.

Gear teeth 56 of gear segment 52, in rotating to its first position, rotates meshing pinion gear 58 sufficiently so that sheave 60 fixed thereto pays out sufficient cable to allow sheave 66 to rotate to the degree where pivotable levers 32, in consequence of gravity and the pull on the webbing by the seat belt retractor 34, drop to a point where the webbing 28, shoulder belt 24 and lap belt 26 are in their first position of occupant restraint. Now, if either or both doors are opened, gas spring 36 thrusts sensing element and piston rod 38 forward, pulling with it attached flexible tape 44. The pulling motion towards the respective door on either flexible tape will rotate gear segment 52 in a clockwise direction due to contact of terminal pins 72 and 74. If only one door is opened, the terminal pin on the inactivated tape will not oppose this rotation because the slotted opening 47 or 48 will slide past the stationary pin as the slotted opening travels its full length.

In rotating clockwise, gear segment 52 engages the meshing pinion 58 and winds up cable 62 on sheave 60. Wind up of cable 62 turns sheave 66 and lifts both pivotable levers 32 toward the vertical (counterclockwise) thereby lifting the seat belts on both the passenger's and driver's side to their second, non-restraining position shown in FIG. 1. Either occupant may now enter or leave the seat with ease. Thus, opening or closing of either door actuates both passive seat belt systems.

In FIG. 2, the position of the parts shown in solid line corresponds to the door closed position and the phantom line corresponds to the position of the parts with the doors open.

In FIG. 2, doors 12 are closed and striker plates 41 are restraining piston rod or sensing element 38 in their cocked position. In this first position, terminal pins 72 and 74 apply only a restraining force on gear segment 52 which has rotated in a counterclockwise direction, urged by helical spring 76. In FIGS. 2 and 3, cable 62 has been payed out the maximum amount, allowing the pivotable levers 32 to lower into their first position, permitting the shoulder and lap safety belts to assume their first position of occupant restraint.

When either or both doors 12 are opened, the stored energy in the compressed springs 36 provides the power for the entire articulation action. This stored energy causes the piston rod or rods 38 to be thrust outwardly, drawing with them flexible tapes 44. Terminal pins 72 and 74 of the tapes now urge gear segment 52 to rotate in a clockwise direction against the lesser urge of helical spring 76 around the point of rotation at 50.

It can be seen that slotted openings 47 and 48 are shaped to accommodate the linear movement of the terminal pins 72 and 74 throughout the curvilinear path of the slotted openings. The slotted openings are also of such a length that if only one door is opened, and only one pin therefore causes the gear segment 52 to rotate, the stationary terminal pin will be unaffected as the slotted opening slides past.

During the rotation of the gear segment 52 which results from the opening of one or both doors 12, gear teeth 56 which are engaged with those of pinion gear 58 cause the pinion gear to rotate counterclockwise, winding in cable 62. This effect, as described under FIG. 1, causes the pivotable levers 32 to rise toward the vertical, raising the seat belt which passes through the slotted free end 28 of the pivotable lever, into its second non-restraining position.

FIGS. 4A–4D are partial diagramatic representations of the action of the major components of the spring-activated automatic articulation device of this invention when either door of the vehicle is opened, when both are opened, or when both are closed.

Figure 4A:
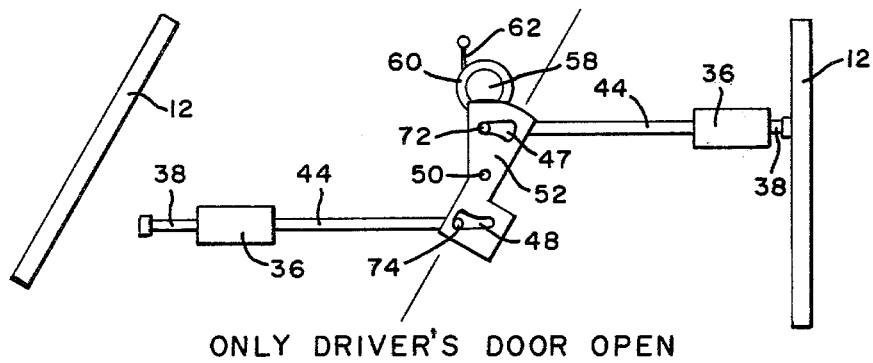
FIGS. 4 A-D are partial schematic drawings showing the position of both sensing elements when both doors are closed, and the response of these elements to the opening of either door or both doors.

In FIG. 4A, the driver's door 12 is open and the passenger's door is closed. Spring 36 on the passenger's side is compressed and cocked, and therefore contains stored potential energy. Spring 36 on the driver's side has been released, and piston rod 38 has been thrust outwardly due to the release of the stored energy of the spring. The movement of piston rod 38 by means of terminal pin 74 in slot 48 has rotated gear segment 52 a limited amount clockwise. Gear segment 52, meshed with pinion gear 58, has rotated pinion gear 58 counterclockwise and caused concentrically fixed sheave 60 to wind in cable 62. As previously explained, the winding in of this cable causes the safety belts of the vehicle on both the driver's and the passenger's seat to move into their second position of non-restraint, even though only one door is opened. Because of the length and contour of the slotted openings 47 and 48, terminal pin 72 was unaffected by the rotation of the gear segment, for the slotted opening slid by that stationary terminal pin.

Figure 4B:
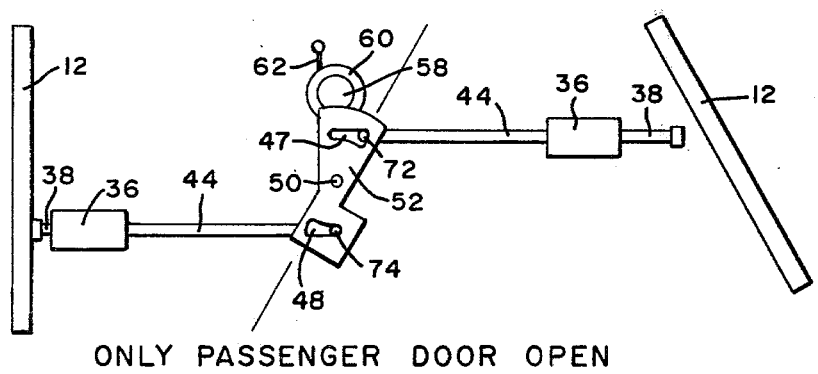

In FIG. 4B, the effect is the same when only the passenger's door is opened. The cable 62 has been wound in, and the safety seat belts of both the driver's seat and the passenger's seat have been moved to their second non-restraining position, with slotted opening 48 sliding past pin 74.

Figure 4C:
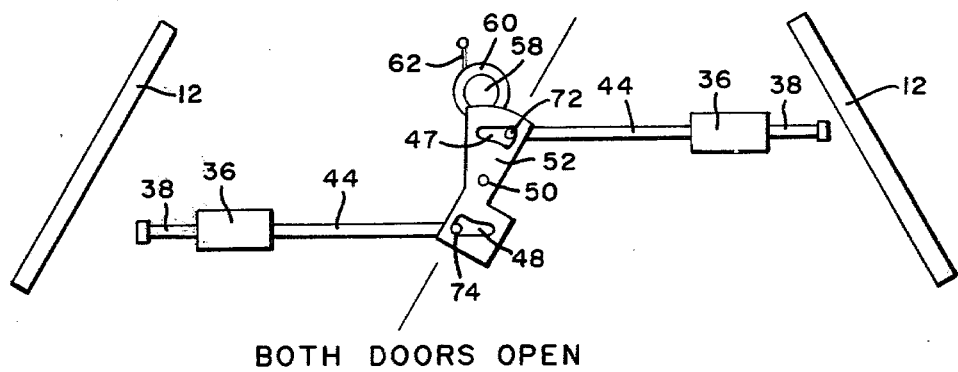

In FIG. 4C, both doors have been opened. The terminal pins on both flexible tapes have cooperated to rotate the gear segment to its second position, but the same effect would have been obtained by the opening of only one door as in FIGS. 4A and B. Once again cable 62 is in its wound in position; both seat belt assemblies are therefore in their second non-restraining positions.

Figure 4D:
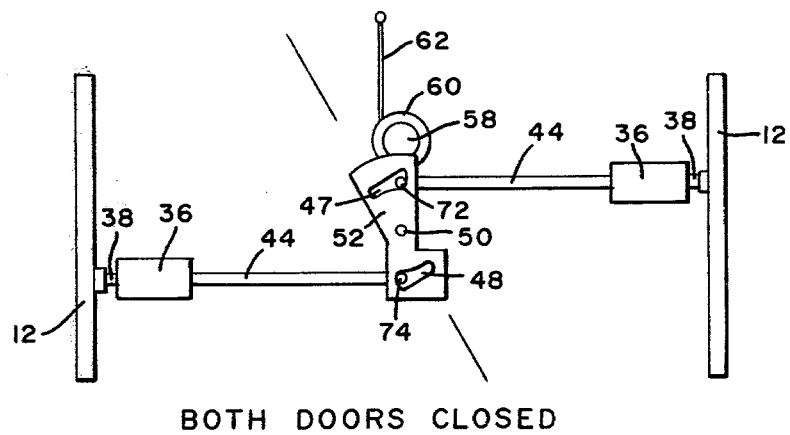

In FIG. 4D, both doors 12 are closed and both springs 32 are compressed, cocked, and contain stored energy. The pistons rods 38, being fully retracted, have extended attached flexible tapes 44 to their first position, thus releasing the gear segment for rotation in a counterclockwise direction in response to the urging of helical spring 76. In rotating counterclockwise, gear segment 52 has rotated the cooperating pinion gear 58 in a clockwise direction, permitting sheave 60 to pay out cable 62, thus moving the safety belts of both the driver's and passenger's seat to their first position of occupant restraint.

As can be seen in FIGS. 2 and 4A–4D, openings 47 and 48 have generally triangular shapes to accommodate movement of pins 72 and 74 without bending flexible tapes 44. Referring to FIG. 4A, when only the driver's door is open, pin 74 is in the left hand corner of slot 48. Pin 72 is located in the left hand corner of slot 47. When the driver's door is closed (FIG. 4D), gear segment 52 rotates counterclockwise due to the bias of spring 76, whereupon pin 74 is moved to the upper corner of its slot 48 and pin 72 is moved to the lower corner of its slot 47.

When the passenger's door is opened after the driver's door is opened (compare FIGS. 4A and 4C), pin 74 remains in its position at the left hand corner of slot 48 and pin 72 is moved to the right hand corner of slot 47. When the passenger's door is opened after both doors are closed (compare FIGS. 4B and 4D), pin 72 moves from its lower corner to its right hand corner of slot 47 and pin 74 moves from its upper corner to its left hand corner in slot 48. Similarly, when the driver's door is opened after both doors are closed (compare FIGS. 4A and 4D), pin 74 is moved from the upper corner to the left hand corner of slot 48 and pin 72 is moved from the lower corner to the left hand corner of slot 47.

It can be seen that in accordance with this invention, a flexible tape is utilized to provide a push-pull action to actuate a passive seat belt restraint system. Although in the foregoing description the motion of the tape actuates movement of the belts, such motion may also or alternatively actuate a manual hook to release the belts to their restraint position. Also, the tape may be employed with a motorized system. Likewise, actuation of the gas springs could release such manual hooks for both seat positions as opposed to direct movement of the belts. This could be accomplished by sensing of the position of the gear selector. For example, upon movement of the gear selector out of the park position, manual convenience hooks which hold the belt in its non-restraining position could be moved to release the belts for both seats. Furthermore, it is to be understood that arrangements of the seat belts other than as shown in the drawings may be provided, such as a two-point as opposed to a three-point system.

It is to be understood that additional variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A passive seat belt system for use in a vehicle having a driver's door and a passenger's door and seating positions adjacent to said doors, said system comprising:

actuating means associated with each of said doors and being actuated upon the opening of the respective door;

seat belt systems associated with each of said seating positions;

belt moving means associated with each of said seat belt systems for moving the same into and out of occupant restraint positions, said seat belt moving means comprising a pair of levers each associated with each of said seating positions and located inboard of said seating positions, said levers being in contact with said seat belt systems, connecting means connecting said levers to each other, a rotatable gear, and cable means extending between said gear and said connecting means; and means responsive to actuation of each of said actuating means to permit said moving means to move each of said seat belt systems out of its occupant restraint position, said means comprising a rotatable gear segment having gear teeth on one end thereof, said gear teeth being intermeshed with said rotatable gear, and said gear segment being connected to each of said actuating means, whereby upon opening of either of said doors, each of said seat belt systems is moved out of its occupant restraint position.

2. The passive seat belt system of claim 1 wherein said gear segment is mounted to said vehicle at a position between said seating positions.

3. The passive seat belt system of claim 2 including a pair of slots in said gear segment and pins extending into each of said slots, each of said pins being in contact with its associated actuating means.

4. The passive seat belt system of claim 3 wherein each of said actuating means comprises a gas spring associated with each of said doors and elongated flexible movable tape means connecting each of said gas spring and pin.

5. The passive seat belt system of claim 4 including a track mounted in said vehicle, said tape means being movable within said track.

6. The passive seat belt system of claim 1 wherein said levers are pivotable in a first direction upon opening of one of said doors to move said seat belt systems out of their occupant restraint positions.

7. The passive seat belt system of claim 6 including retractor means for moving each of said seat belt systems into occupant restraint position upon closing of both of said doors.

8. The passive seat belt system of claim 7 wherein each of said seat belt systems comprises a retractor mounted inboard of said seating position and seat belt webbing extending from said retractor to said door.

9. The passive seat belt system of claim 8 including a length of seat belt webbing mounted between upper and lower portions of said door, and said seat belt webbing extending from said retractor terminating in a ring, said length of webbing mounted on the door extending through said ring.

* * * * *